United States Patent [19]
Kojima

[11] Patent Number: 6,003,945
[45] Date of Patent: Dec. 21, 1999

[54] SEAT RECLINING MECHANISM FOR VEHICLES

[75] Inventor: Yasuhiro Kojima, Chiryu, Japan

[73] Assignee: Aisin Seiki Kabushiki Kaisha, Kariya, Japan

[21] Appl. No.: 09/093,721

[22] Filed: Jun. 9, 1998

[30] Foreign Application Priority Data

Jun. 10, 1997 [JP] Japan .................................. 9-152367

[51] Int. Cl.$^6$ ........................................................ B60W 2/02
[52] U.S. Cl. ........................................................ 297/367
[58] Field of Search .............................. 297/367, 378.12, 297/366

[56] References Cited

U.S. PATENT DOCUMENTS

| 5,558,402 | 9/1996 | Yamada | 297/363 X |
| 5,678,895 | 10/1997 | Matsuura et al. | 297/367 X |
| 5,762,400 | 6/1998 | Okazaki et al. | 297/367 X |
| 5,779,313 | 7/1998 | Rohee | 297/367 |
| 5,816,656 | 10/1998 | Hoshihara et al. | 297/367 X |

FOREIGN PATENT DOCUMENTS

| 8-52040 | 2/1996 | Japan . | |
| 2 078 294 | 6/1980 | United Kingdom | 297/366 |

*Primary Examiner*—Eileen Dunn Lillis
*Assistant Examiner*—Brian H. Buck
*Attorney, Agent, or Firm*—Burns, Doane, Swecker & Mathis, LLP

[57] ABSTRACT

A seat reclining mechanism for a vehicle has a pawl which is engageable with a ratchet formed on a upper arm. The pawl 13 is moved along a guide portion 11 having opposed side faces 11a, 11a and a projecting wall 14 having side faces 14a, 14a.

5 Claims, 4 Drawing Sheets

SEAT RECLINING MECHANISM FOR VEHICLES

BACKGROUND OF THE INVENTION

The present invention relates to a seat reclining mechanism for adjusting an angle of inclination of a seat back with respect to a seat cushion.

A vehicular seat reclining mechanism of this kind is known and disclosed for example in Japanese Patent Laid-Open Publication No. Hei 8-52040 (1996).

This vehicular seat reclining mechanism includes a lower arm adapted to be secured on a seat cushion, an upper arm adapted to be secured on a seat back and turnably connected with the lower arm, the upper arm having a ratchet, further, a pawl interposed between opposed surfaces of the lower arm and the upper arm and slidable along guide wall means formed on the lower arm to engage with or disengage from the ratchet, a cam member interposed between said opposed surfaces and engageable with the pawl to push the pawl in the direction for meshing with the ratchet, and a handle supported on a shaft passing through both the arms and capable of rotation of the cam member when it is operated.

In this mechanism of the prior art, the pawl is forced to be moved into meshing engagement with the ratchet by the cam member, and the turns of the upper arm with respect to the lower arm are regulated by guiding and supporting the pawl by the guide wall means. But, the upper arm is turned with respect to the lower arm by sliding the pawl along the guide wall means to release the meshing engagement with the ratchet.

In this conventional device, on the other hand, in order to improve the strength in the turn regulation of the upper arm with respect to the lower arm, regulating teeth to mesh with the pawl are additionally formed on the lower arm so that a high load to be applied to the upper arm may be ensured by assist of the meshing engagement between the pawl and the additional regulating teeth.

In the conventional device thus constructed, however, since the regulating teeth mesh with the pawl, a size management of high accuracy is required to form the additional regulating teeth and has to be performed not to influence the meshing engagement between the ratchet and the pawl, thereby to cause a rise in the cost. On the other hand, it is difficult to suppress the inclination of the pawl intentionally when the high load is applied to the upper arm. The disengagement between the ratchet and the pawl may be caused by the floating of the pawl, as caused by a deformation of the guide wall means.

SUMMARY OF THE INVENTION

Therefore, the invention has an object to suppress the inclination of a pawl with respect to a ratchet by a simple structure.

The basic mechanism, as provided in the invention for achieving the above-specified object, comprises a regulating wall which comes into abutment against the pawl to suppress the inclination of the pawl with respect to guide wall means.

According to this basic mechanism, the pawl and the regulating wall come, when a high load is applied to the upper arm, into abutment to endure the high load. At this time, moreover, the pawl can be held in a direction to mesh with the ratchet by the abutment between the pawl and the regulating wall thereby to suppress the inclination of the pawl with respect to the guide wall means.

Preferably, the regulating wall may be a projecting wall formed on the lower arm.

Preferably, the regulating wall may be a convex portion formed on the cam member.

DESCRIPTION OF THE PREFERRED EMBODIMENT

Figure 1:
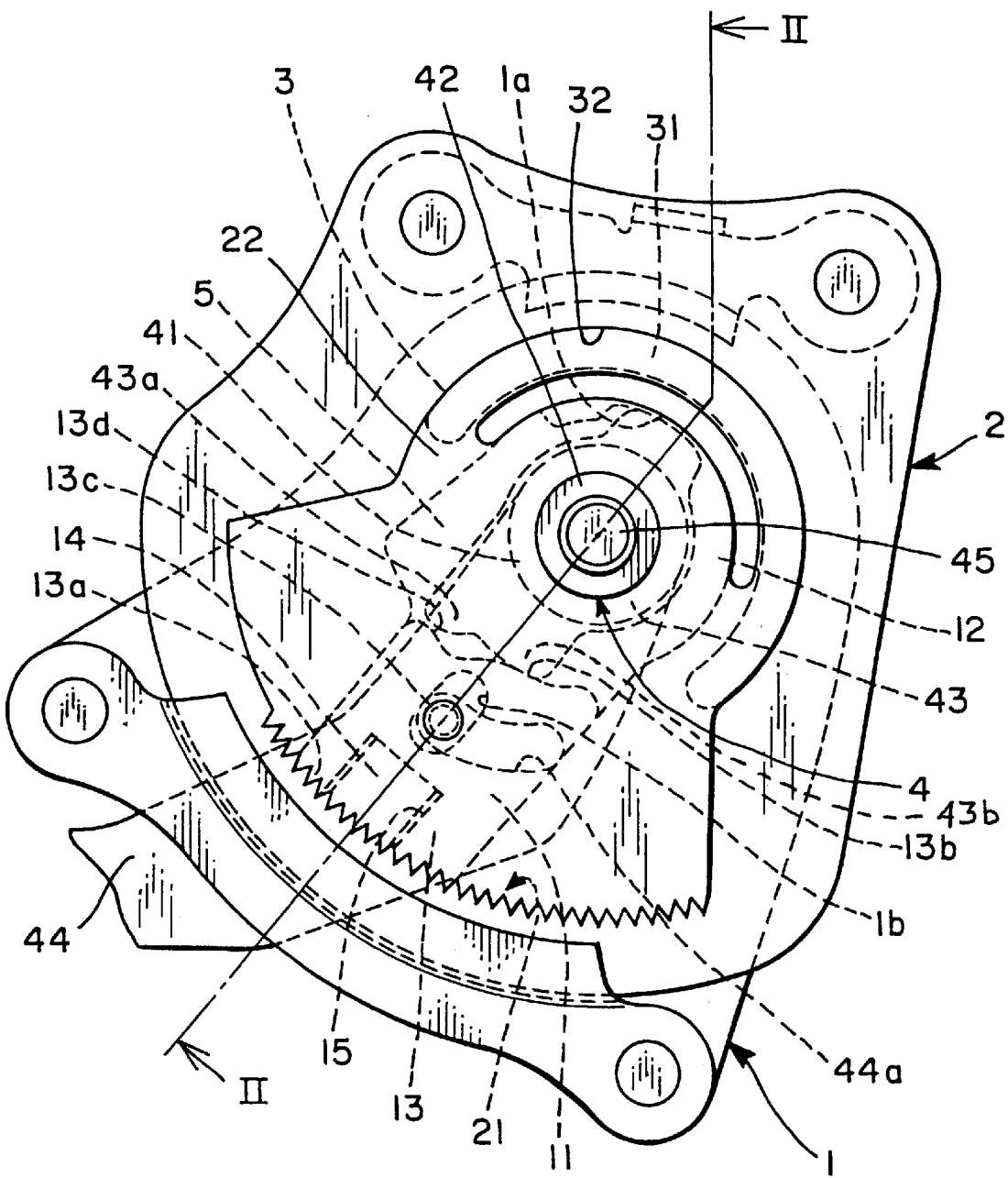
FIG. 1 is a front elevation of a vehicular seat reclining mechanism according to the invention.
Figure 2:
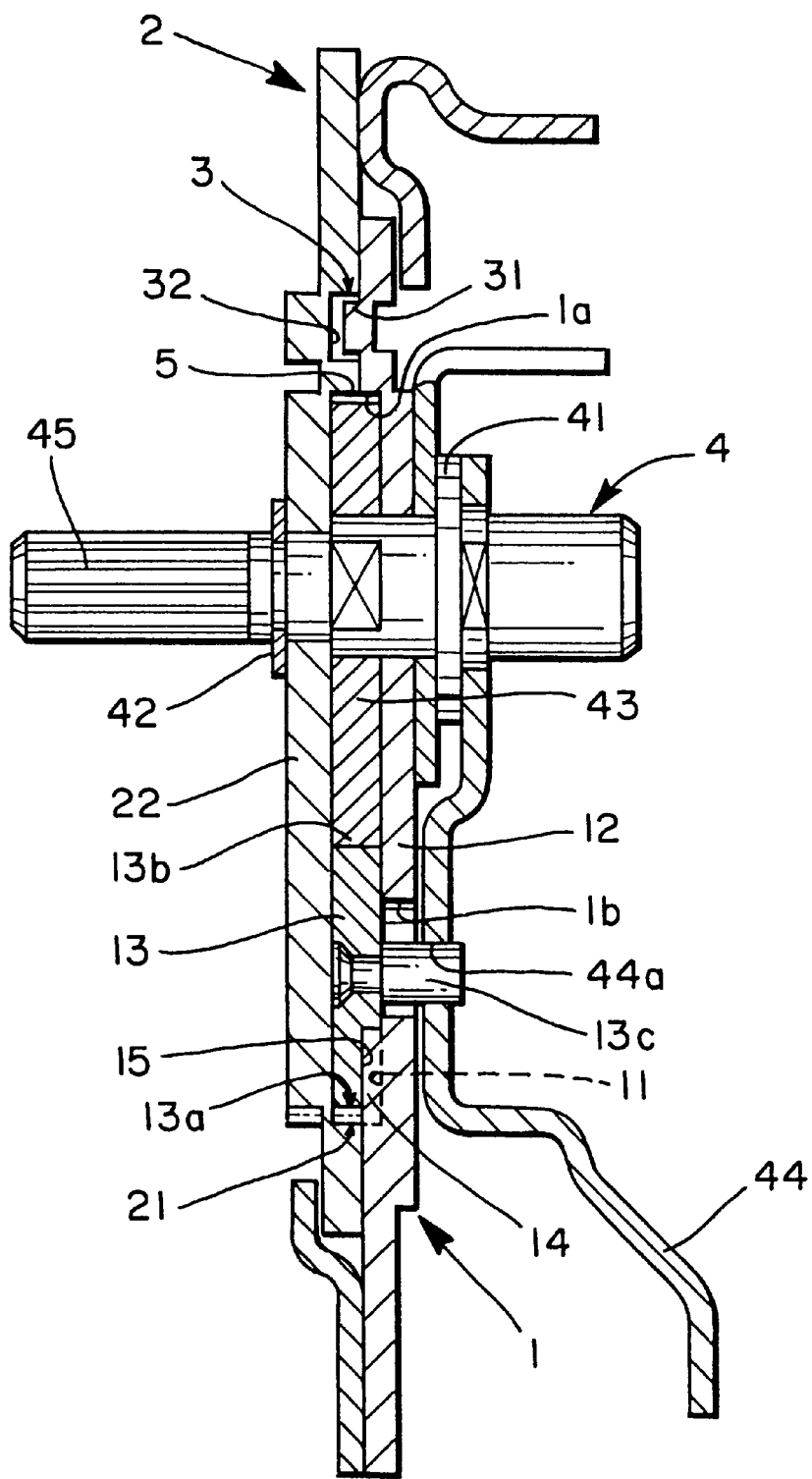
FIG. 2 is a section taken along a line II—II of FIG. 1.

On a lower arm 1 adapted to be fixed on one side of a seat cushion (not-shown), as shown in FIGS. 1 and 2, there is turnably supported an upper arm 2 fixed on one side of a seat back (not-shown), through a bearing mechanism 3 in which an arcuate protrusion 31 formed on the lower arm 1 and an arcuate recess 32 formed on the upper arm 2 are fitted.

As shown in FIG. 2, one side surface of the lower arm 1 is opposed to the side surface of the upper arm 2 and a rotatable shaft 4 extends horizontally through both the arms 1, 2. Both the arms 1, 2 have pressed zones 12, 22 to provide a closed space disposed between the opposed side surfaces of both the arms 1, 2. The lower portion of the pressed zone 22 formed on the side surface of the upper arm 2 is provided with inwardly projecting toothed zone, namely, a ratchet 21 and the pressed zone 12 formed on the side surface of the lower arm 1 is provided with a guide portion 11 which extends toward the ratchet 21.

The arcuate recess 32 of the bearing mechanism 3 extends to the closed space 5. On the other hand, an axial play of the lower arm 1 and the upper arm 2 are so regulated by a flange portion 41 formed on the rotatable shaft 4 and a washer 42 fitted on the rotatable shaft 4 that it is prevented from coming out of the rotatable shaft 4.

Figure 3:
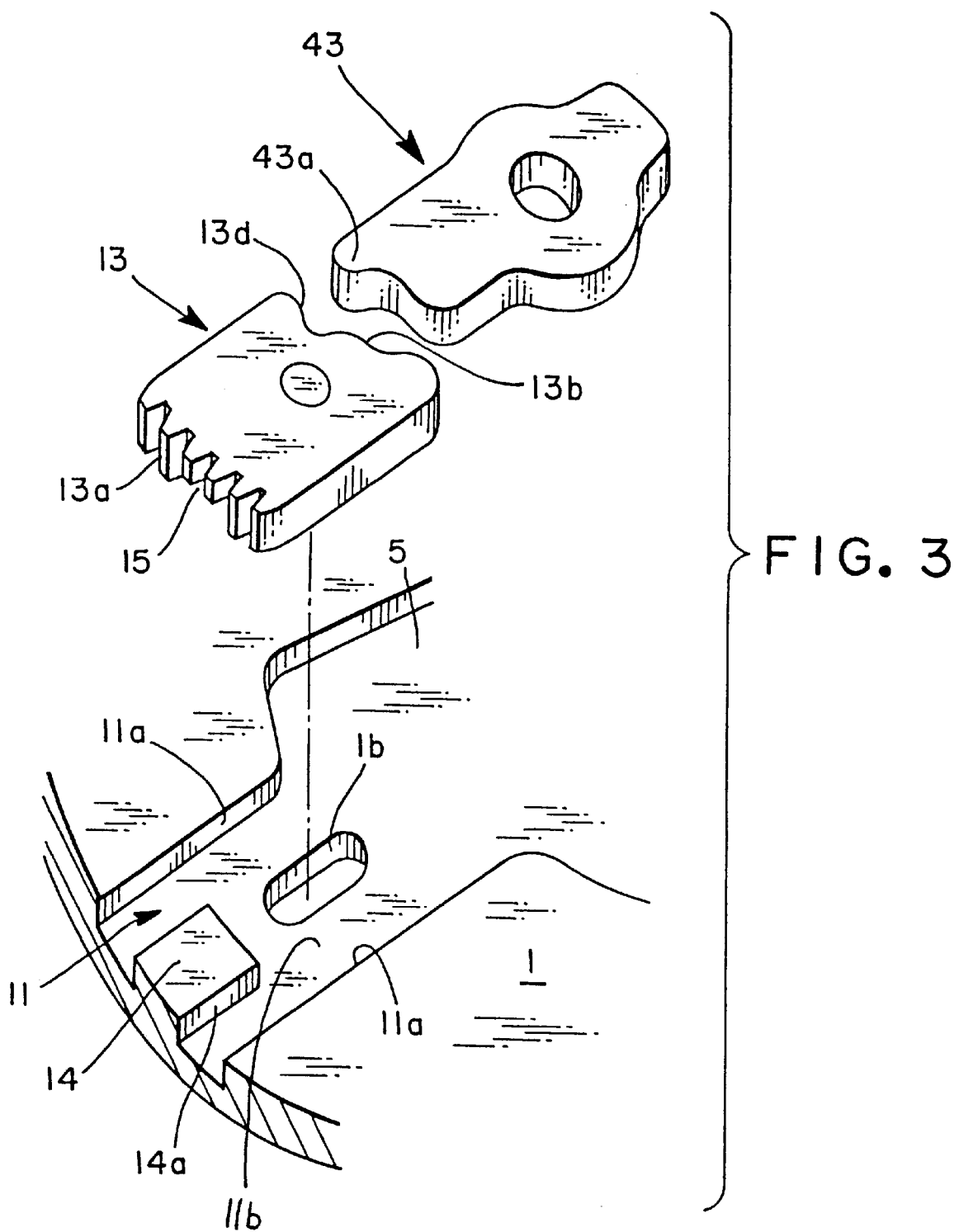
FIG. 3 is an exploded perspective view showing a guide portion and a pawl supporting structure of the vehicular seat reclining mechanism according to the invention.

In the closed space 5, there are mounted a cam member 43 and a pawl 13 having teeth 13a. The cam member 43 is so held on the rotatable shaft 4 as to turn with the rotatable shaft 4. The pawl 13 is so supported by the lower arm 1 that it may be moved by the guide portion 11 to establish the engagement of the teeth 13a with the ratchet 21. As shown in FIG. 3, the guide portion 11 has a width substantially equal to that of the pawl 13 and is provided with a pair of opposed side faces 11a confronting each other in parallel. The side faces 11a are extended in the moving direction of the pawl 13 to arrange it to guide and support it. On the back wall 11b of the guide portion 11, on the other hand, there is formed a projecting wall 14 which is provided with a pair of side faces 14a confronting the side faces 11a in parallel.

Figure 4:
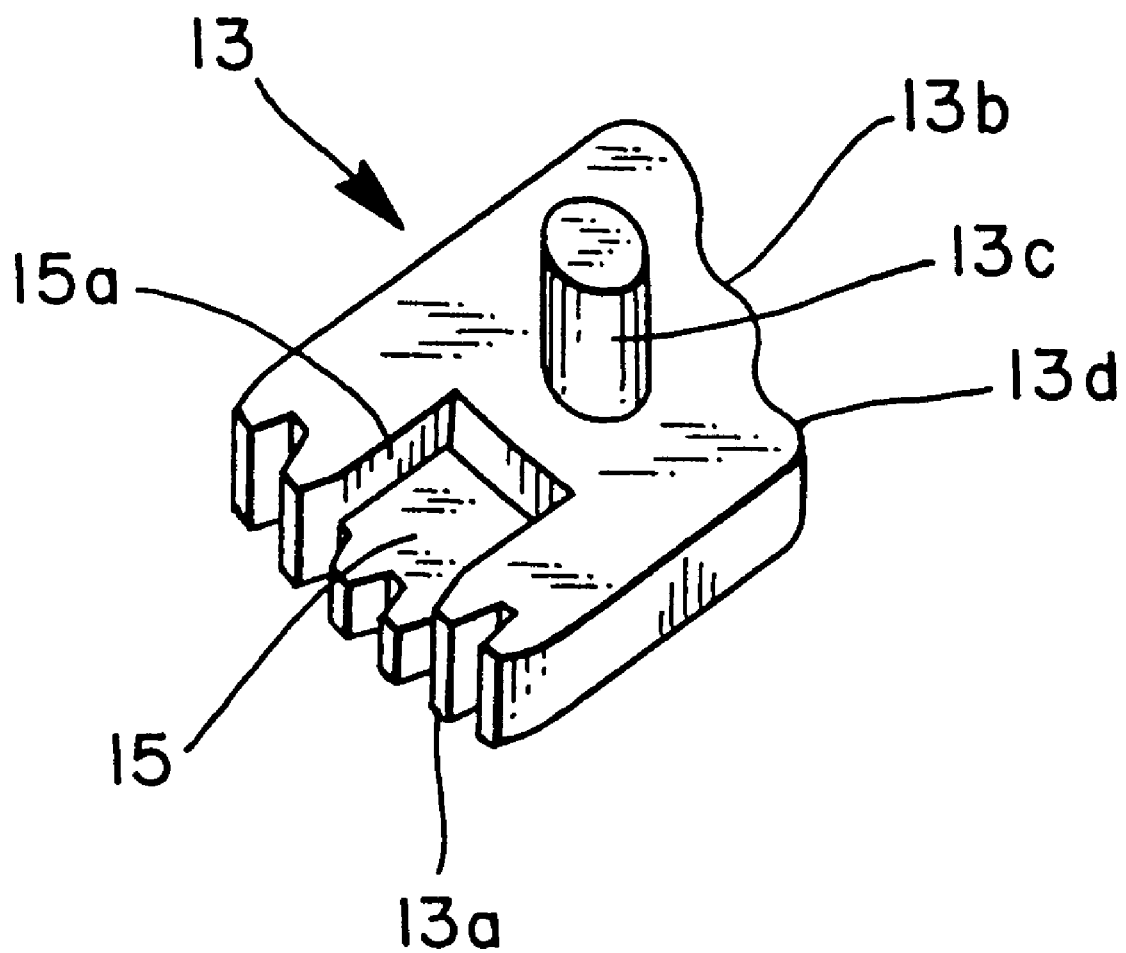
FIG. 4 is a perspective view showing a pawl according to the invention.

In the pawl 13, as shown in FIGS. 3 and 4, there is formed a groove 15 for fitting the projecting wall 14 movably. This groove 15 is opened at its one end (on the side of the ratchet 21) of the moving direction of the pawl 13, and is provided with a pair of side faces 15a extended in parallel with the side faces 14a of the projecting wall 14. This projecting wall 14 is so arranged in the groove 15 that its side faces 14a confront the side faces 15a of the groove 15 while leaving a predetermined clearance inbetween. Alternatively, the projection wall 14 is provided with the pawl 13 which is slidable in the groove 15 formed on the guide portion 11.

The cam member 43 is brought, when turned, into contact with a cam face 1a formed on the lower arm 1 and a cam face 13b formed on the pawl 13, thereby to control the movement of the pawl 13 (or the meshing engagement between the pawl 13 and the ratchet 21). At this cam member 43, on the other hand, a convex portion 43a is formed. This convex portion 43a is arranged to confront through a predetermined clearance an abutment face 13d of the pawl 13, as lead from the cam face 13b, when the cam member 43 and the cam face 13b of the pawl 13 come into contact.

Here, the contact between the cam member 43 and the cam face 1a is caused to push the arcuate convex 31 of the bearing mechanism 3 onto the wall face of the arcuate recess 32 of the bearing mechanism 3 to prevent the rattle of the bearing mechanism 3 by depressing the upper arm 2 downward of FIG. 2 with respect to the lower arm 1 at the meshing engagement between the pawl 13 and the ratchet 21 through the contact between the cam member 43 and the cam face 13b of the pawl 13 and through the meshing engagement between the pawl 13 and the ratchet 21.

On the rotatable shaft 4, there is so fixed a control lever or handle 44 as to turn together with the rotatable shaft 4. This control lever 44 is arranged on the outer face side of the closed space 5, as opposed to the inner face contacting with the upper arm 2 of the lower arm 1, and is bent in the moving direction of the pawl 13. The control lever 44 has a cam slot 44a extended in its turning direction. A pin 13c is inserted into this cam slot 44a, which is fixed to the pawl 13, so that the movement of the pawl 13 (or the engagement between the pawl 13 and the ratchet 21) is controlled by the cam slot 44a and the pin 13c. Here, the pin 13c of the pawl 13 is extended to the outside of the closed space 5 through a slot 1b which is formed in the lower arm 1 and extended in the moving direction of the pawl 13.

Around the leading end of the rotatable shaft 4 on the side of the lower arm 1, there are arranged a spiral spring (not-shown) for urging the upper arm 2 in one direction with respect to the lower arm 1 and a coil spring (not-shown) for resisting to the turning operation of the control lever 44. A spline 45 is formed on the leading end of the rotatable shaft 4 on the side of the upper arm 2, to which is attached a interlocking shaft (not-shown) mounted on a pivot (not-shown) fixed on the other side of the seat cushion of a upper arm (not-shown) fixed on the other side of the seat back for controlling the turns with respect to a arm (not-shown) to synchronize the controls of the turns on one and other sides of the seat back with respect to the seat cushion.

With the construction thus far described, the turns of the upper arm 2 with respect to the lower arm 1 are regulated by the meshing engagement between the pawl 13 and the ratchet 21 so that the seat back is held at a predetermined angle of inclination with respect to the seat cushion. When the control lever 44 is operated in this state in one direction, the cam member 43 is turned clockwise (in FIG. 1) to release the contact between the cam member 43 and the cam face 13b of the pawl 13, and the pawl 13 is moved closer to the rotatable shaft 4 in the radial direction (in FIG. 1) along the side faces 11a of the guide portion 11 by the action of the cam slot 44a of the control lever 44. As a result, the ratchet 21 and the pawl 13 are disengaged to permit the upper arm 2 to tilt with respect to the lower arm 1.

By tilting the seat back in this state with respect to the seat cushion, the angle of inclination of the seat back with respect to the seat cushion can be adjusted to a desired value. When the operation of the control lever 44 is released, the cam face engaging portion 43b of the cam member 43 and the cam face 13b of the pawl 13 come into contact with each other, as contrary to the aforementioned one, so that the pawl 13 is moved apart from the rotatable shaft 4 in the radial direction (in FIG. 1) to bring the pawl 13 and the ratchet 21 into engagement. As a result, the turns of the upper arm 2 with respect to the lower arm 1 are regulated to hold the seat back at a desired angle of inclination with respect to the seat cushion.

When a high load acts on the upper arm 2 through the seat back with the turns of the upper arm 2 with respect to the lower arm 1 being regulated by the meshing engagement between the pawl 13 and the ratchet 21, the side faces 14a of the projecting wall 14 of the guide portion 11 and the side faces 15a of the groove 15 of the pawl 13 come into abutment against each other, and the convex portion 43a of the cam member 43 and the abutment face 13d of the pawl 13 come into abutment against each other.

By these abutments, the high load, as applied to the upper arm 2, is distributed and transmitted to the lower arm 1. As a result, the side faces 11a are prevented from being deformed by the contact between the pawl 13 and the side faces 11a of the guide portion 11. Moreover, the inclination of the pawl 13 is regulated by those abutments. As a result, the floating of the pawl 13 from the ratchet 21 is suppressed to prevent the disengagement between the pawl 13 and the ratchet 21.

With the regulating wall for suppressing the inclination of the pawl with respect to the guide walls, according to the invention, the pawl and the regulating or projecting wall come into abutment to endure the high load, if applied to the upper arm, and the inclination of the pawl with respect to the guide walls can be suppressed. As a result, the floating of the pawl from the ratchet can be prevented to eliminate the disengagement between the pawl and the ratchet.

According to the invention, the regulating wall can be exemplified by either the convex wall formed on the lower arm capable of abutting against the pawl or the convex portion formed on the cam member so that the size management of high accuracy can be eliminated unlike the prior art to take an advantage in cost.

As many apparently widely different embodiments of the present invention can be made without departing from the spirit and scope thereof, it is to be understood that the invention is not limited to the specific embodiments thereof except as defined in the appended claims.

What is claimed is:

1. A seat reclining mechanism for a vehicle, comprising:
   a lower arm adapted to be secured on either a seat cushion or a seat back;
   an upper arm adapted to be secured on the other of the seat cushion and the seat back and rotatably supported to the lower arm, the upper arm having a ratchet;
   a pawl slidably disposed in a closed space defined between opposed side surfaces of both the arms and engageable with the ratchet, the pawl being slidable along a guide portion formed on the lower arm, the guide portion including opposed guide walls;
   a cam member disposed in the closed space and engageable with the pawl for pushing the pawl in the direction to mesh with the ratchet;
   a rotatable shaft passing through both the arms and secured to the cam member; and
   a projecting regulating wall formed on said lower arm for suppressing the inclination of the pawl with respect to the guide portion.

2. A seat reclining mechanism according to claim 1, wherein said regulating wall is a convex portion formed on said cam member.

3. A seat reclining mechanism for a vehicle, comprising:
- a lower arm adapted to be secured on either a seat cushion or a seat back;
- an upper arm adapted to be secured on the other of the seat cushion and the seat back and rotatably supported to the lower arm, the upper arm having a ratchet;
- a pawl slidably disposed in a closed space defined between opposed side surfaces of both the arms and engageable with the ratchet, the pawl having side surfaces and being slidable along a guide portion formed on the lower arm, the guide portion having opposed side faces;
- a cam member disposed in the closed space and engageable with the pawl for pushing the pawl in the direction to mesh with the ratchet;
- a rotatable shaft passing through both the arms and secured to the cam member; and
- a regulating wall for suppressing the inclination of the pawl with respect to the guide portion, said regulating wall being a projecting wall formed on said lower arm, said projecting wall having side faces, the guide portion formed on the lower arm being a groove having the opposed side faces which extend radially outwardly in which the pawl is slidably housed, and the projecting wall being disposed between the opposed side faces of the guide portion, the pawl having a recess in which the projecting wall is fitted, the recess in the pawl having side faces so that side faces of the recess of the pawl come into slidable contact with the side faces of the projecting wall and the side faces of the pawl come into slidable contact with the opposed side surfaces of the guide portion.

4. A seat reclining mechanism according to claim 3, wherein the rotatable shaft is rotated by a control lever having a cam slot, the pawl having a pin extending through a slot formed on the lower arm and the cam slot of the control lever, the pin causing the position of the pawl to be changed with respect to the guide portion depending upon an operation of the control lever.

5. A seat reclining mechanism for a vehicle, comprising:
- a lower arm adapted to be secured on either a seat cushion or a seat back, the lower arm including a guide portion having opposed walls;
- an upper arm adapted to be secured on the other of the seat cushion and the seat back and rotatably supported to the lower arm, the upper arm having a ratchet;
- a pawl slidably disposed in a closed space defined between opposed side surfaces of both the arms and engageable with the ratchet, the pawl being slidable along the guide portion formed on the lower arm;
- a cam member disposed in the closed space, said cam member having an end surface facing said pawl, said end surface of said cam member including a convex portion and a cam face engaging portion that are spaced apart from one another, said pawl having an end surface facing toward the cam member, said end surface of said pawl including a cam face and a concave portion provided as an abutment face, said cam face engaging portion of said cam member being engageable with said cam face of the pawl for pushing the pawl in the direction to mesh with the ratchet;
- a rotatable shaft passing through both the arms and secured to the cam member; and
- the convex portion on the cam member being adapted to move into abutment with the abutment face of the concave portion when said pawl is in meshing engagement with the ratchet and upon application of a load to one of the upper and lower arms to suppress inclination of the pawl with respect to the guide portion.

* * * * *